H. KLEINSCHMIDT, A. HALPERN & E. POSPISCHIL.
AUTOMATIC LIGHTER FOR GAS BURNERS.
APPLICATION FILED SEPT. 6, 1912.
1,216,817.
Patented Feb. 20, 1917.
8 SHEETS—SHEET 1.
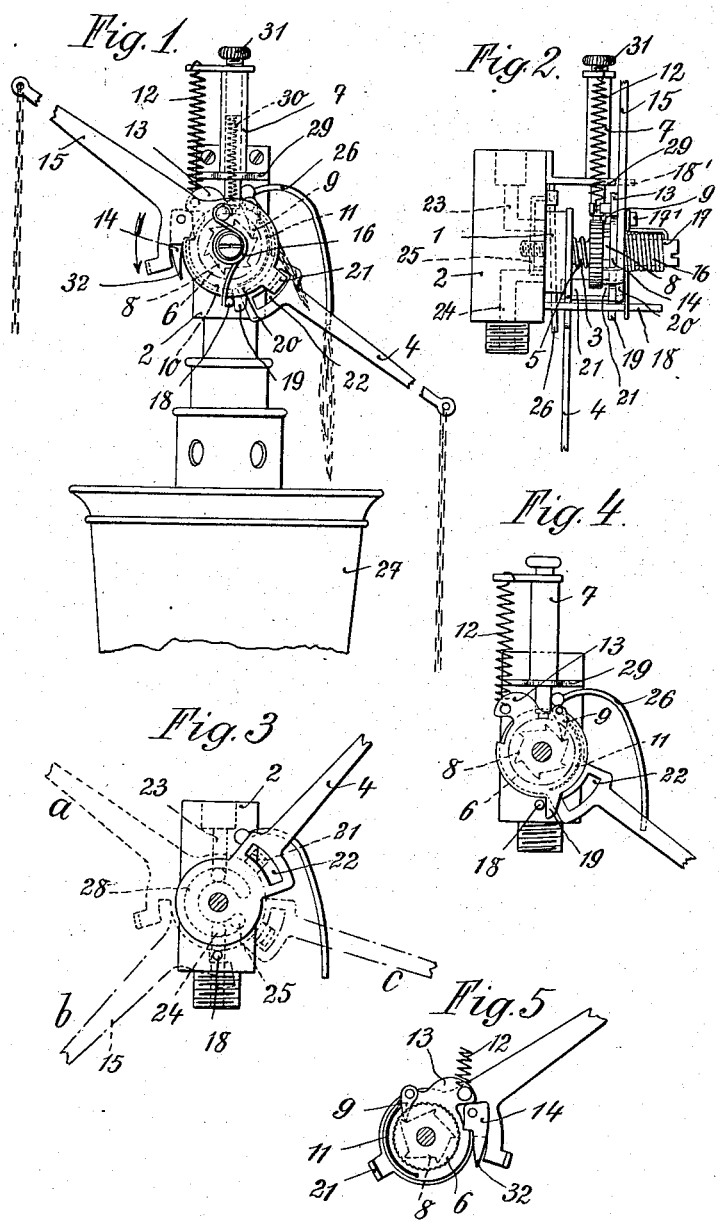

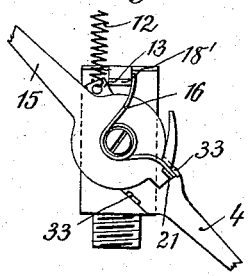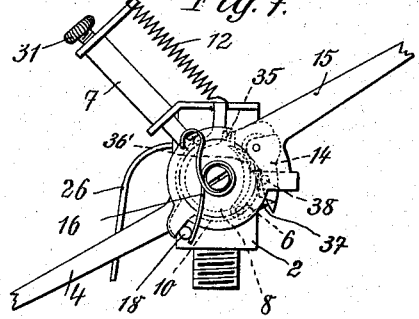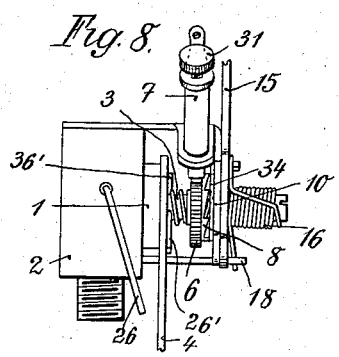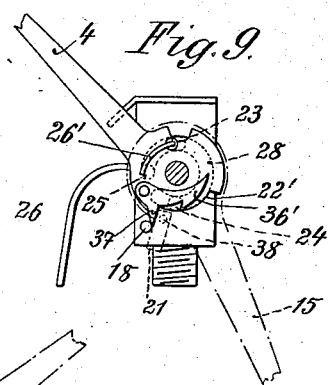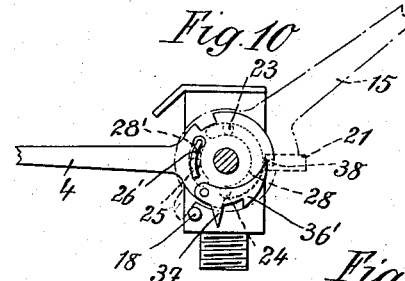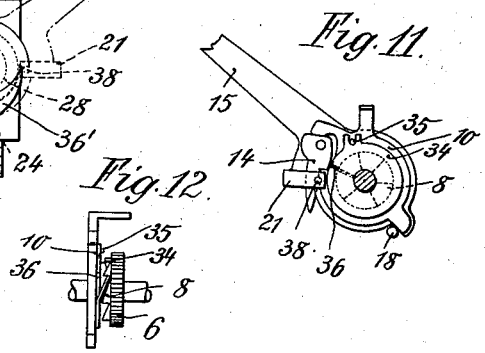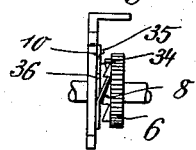

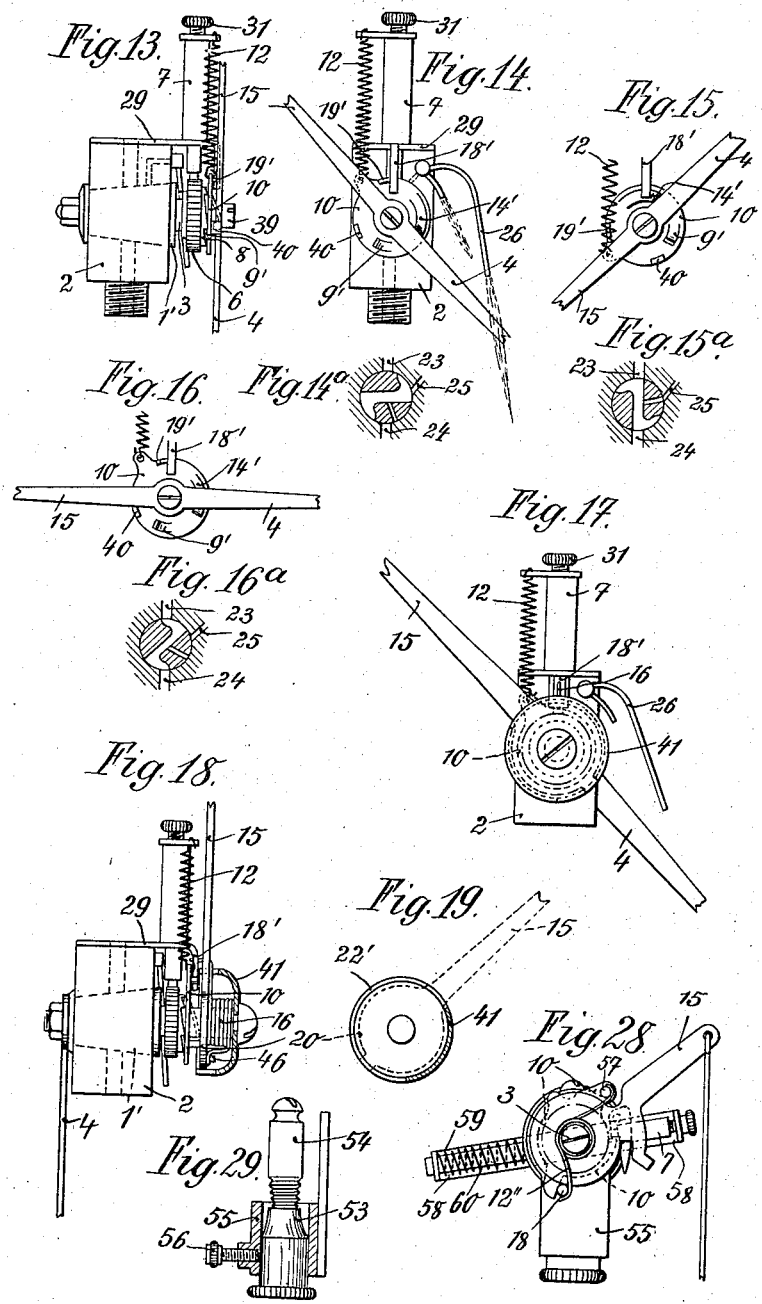

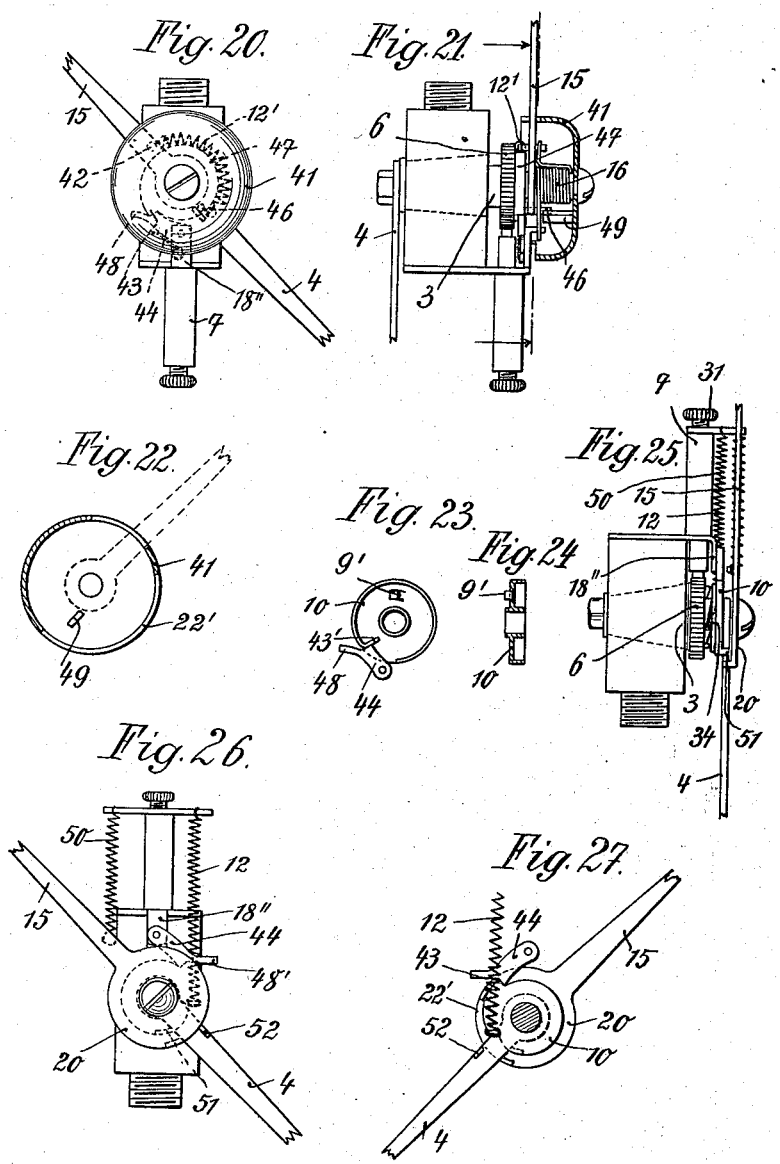

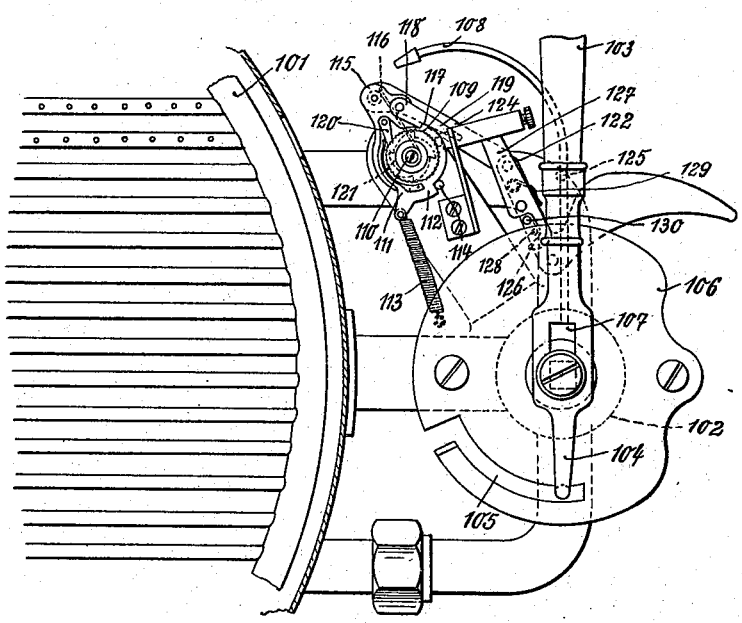

H. KLEINSCHMIDT, A. HALPERN & E. POSPISCHIL.
AUTOMATIC LIGHTER FOR GAS BURNERS.
APPLICATION FILED SEPT. 6, 1912.
1,216,817.
Patented Feb. 20, 1917.
8 SHEETS—SHEET 6.
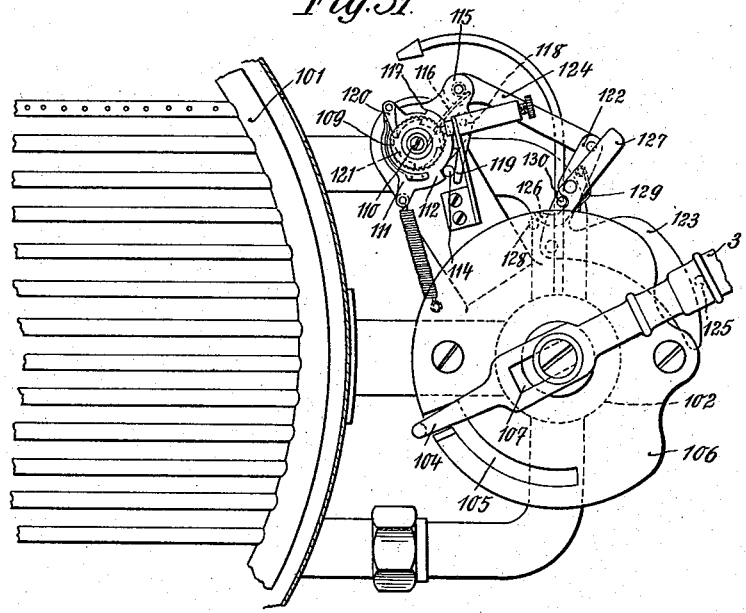
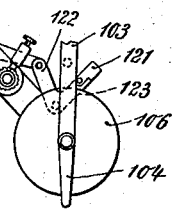

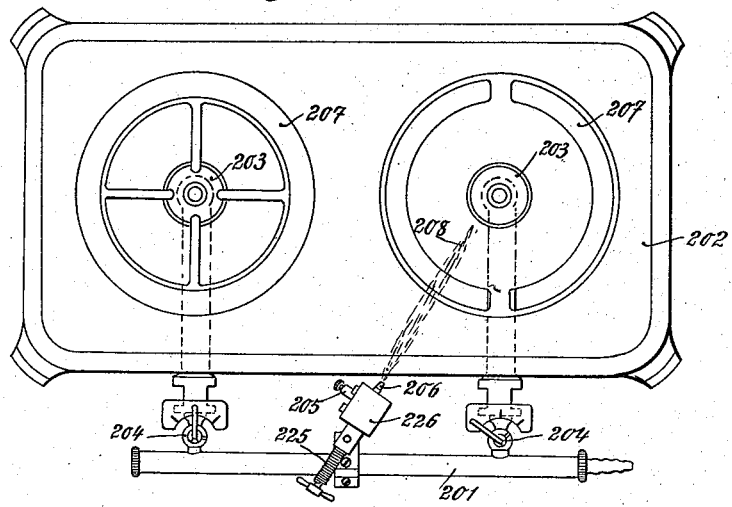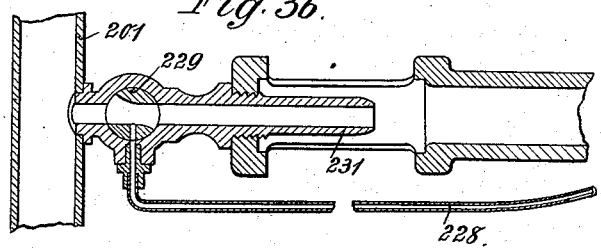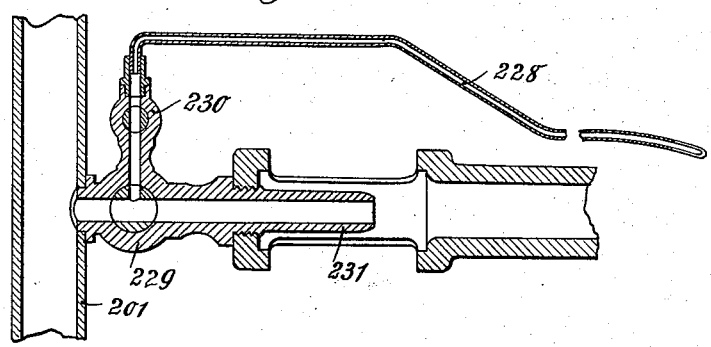

H. KLEINSCHMIDT, A. HALPERN & E. POSPISCHIL.
AUTOMATIC LIGHTER FOR GAS BURNERS.
APPLICATION FILED SEPT. 6, 1912.
1,216,817.
Patented Feb. 20, 1917.
8 SHEETS—SHEET 8.
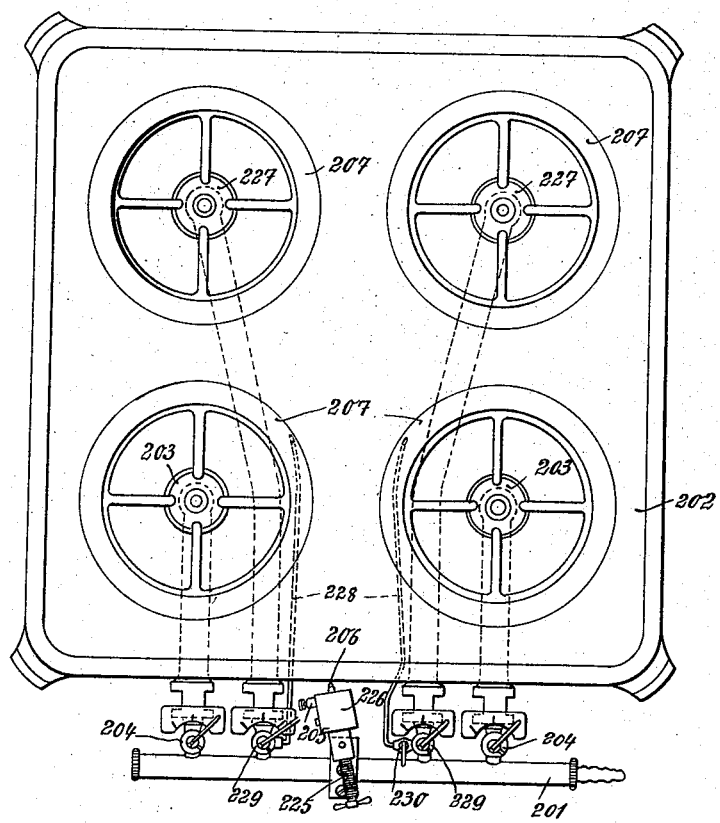
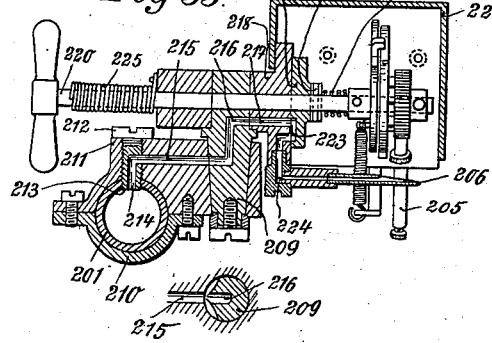

UNITED STATES PATENT OFFICE.

HANS KLEINSCHMIDT, OF WILMERSDORF, GERMANY, AND ADOLF HALPERN AND EMIL POSPISCHIL, OF VIENNA, AUSTRIA, ASSIGNORS TO THE FIRM OF GAS-ZÜNDER GESELLSCHAFT M. B. H., OF BERLIN, GERMANY.

AUTOMATIC LIGHTER FOR GAS-BURNERS.

1,216,817. Specification of Letters Patent. Patented Feb. 20, 1917.

Application filed September 6, 1912. Serial No. 719,014.

*To all whom it may concern:*

Be it known that we, HANS KLEINSCHMIDT, a subject of the German Emperor, residing at Wilmersdorf, Germany, and ADOLF HALPERN and EMIL POSPISCHIL, subjects of the Emperor of Austria, residing at Vienna, Austria, have invented new and useful Improvements in Automatic Lighters for Gas-Burners, of which the following is a specification.

The present invention relates to an automatic lighter which is chiefly intended for gas burners, and in which a friction wheel under action of a spring is released, on the opening of the gas valve, by means of the member effecting such opening; the friction wheel being thereby shot forward and striking sparks on a pin made of cerium iron or some other pyrophorous material, which sparks will either directly or by the aid of one or several auxiliary flames ignite the gas emerging from the main gas tube.

In the accompanying drawings the invention forming the subject of the present invention, is exemplified in several constructional forms.

Figure 1 is a lighter for inverted incandescent gas lamps, seen from in front;

Fig. 2 is the same device, seen from the side.

Fig. 3 shows a front view of the gas valve in form of a rotary valve in the same device, the igniting mechanism proper having been removed.

Fig. 4 illustrates in the same manner the igniting mechanism proper, the igniting lever having been omitted.

Fig. 5 is a rear view of the igniting lever.

Fig. 6 shows an arrangement analogous to Fig. 1 but with certain modifications in the details.

Fig. 7 is a front view of another constructional form of the lighter.

Fig. 8 is a side view of same.

Figs. 9–11 show a third constructional form in a manner analogous to Figs. 1–3 and 5 respectively.

Fig. 12 is a detail of this device.

Figs. 13–16 show a fourth, and Figs. 17–19 a fifth constructional form.

Figs. 20–22 a sixth constructional form.

Figs. 23 and 24 are details of this constructional form.

Figs. 25–27 illustrate another constructional form for inverted lamps and

Figs. 28 and 29 show a constructional form for an ordinary gas or acetylene gas burner in front and side view respectively.

Figs. 30–32 illustrate the use of the new lighter in combination with a gas bath stove.

Figs. 33–37 show the same in combination with a gas cooker, Figs. 30 and 31 being top views of the device in two different positions, while Fig. 32 is a detail.

Fig. 33 shows the combination of the lighter with a gas cooker and

Fig. 34 with a cooker with four burners.

Fig. 35 is a longitudinal section through the lighter and Figs. 36 and 37 are details.

In the constructional forms according to Figs. 1–12 the gas pipes are closed by means of a rotary valve, whereas in the constructional forms according to Figs. 12–27 a plug cock is employed.

The rotary valve 1 bears on the one side of a brass body 2 having the shape of a nipple, containing the gas passages, and ground to a correspondingly flat surface; it is pivoted on a pin 3, which carries also the other movable parts of the lighter device and is screwed into the body 2. The rotary valve is rigidly secured to a lever 4, by means of which the gas supply can be shut off and which shall hereinafter be called the closing lever.

A volute spring 5 fitted over the pin 3 will provide for a close joint of the valve on its bearing surface. Against this spring bears the friction wheel 6 which coöperates with a pin made of pyrophorous metal projecting from the lower end of the sleeve 7, for producing the sparks. The friction wheel 6 is fitted loose on the pin 3 and has on its front side a ratchet wheel 8 into the teeth of which engages a pawl 9 which is pivoted to a disk 10 freely rotatable on pin 3 and hereinafter called the "intermediate disk". The pawl 9 is kept in engagement with the teeth 8 of the friction wheel by means of a spring 11.

The intermediate disk 10 tends to turn in the direction of the hands of the clock due to the action of a spring 12, one end of which is secured to a projection 13 of said disk and the other end of which is secured to an arm of the sleeve shaped pin holder 7. But such rotation is prevented by a second pawl 14, which is attached to lever 15, hereinafter called the "ignition lever" freely rotatable on the pin 3. The pawl 14 is opposed to the pawl 9. The ignition lever 15 is likewise drawn in the direction of the hands of the clock by means of a torsional spring 16 which surrounds a forward extension 17 practically forming a boss for the lever 15. This spring acts with its one end against a pin 17' of the ignition lever terminating in a round disk 20 and bears with its other end against a pin 18 screwed into body 2, which pin 18 serves at the same time as an abutment for a lug 19 on the intermediate disk 10. Opposite to the lever 15 the disk 20 has an extension 21, which is bent over backward and engages in a recess 22 in lever 4.

The seat of the rotary valve 1 has three bores 23, 24 and 25 (Fig. 3) of which the former communicates with the gas supply, the second with the main pipe leading to the burner and the third with the ignition by-pass 26. This by-pass is screwed into the body 2 to the right of the pyrophorous pin holder 7 and projects to about the level of the friction wheel 6, where it is bent off to the right and extends with its orifice to opposite the point whence the gas emerges from the burner 27. This by-pass tube 26 is preferably made so thin, that it can be easily bent, so that the direction and the position of its orifice can be adapted to the various circumstances. Close to the point where the friction wheel produces the sparks, the tube 26 has an opening which is directed toward the orifice of the tube, so that the stream of gas emerging from this opening will meet with that emerging from the orifice.

The rotary valve 1 has a circular recess 28 on the side bearing against body 2, which registers at the position of rest shown in Fig. 1 only with the upper bore 23 (Fig. 3), and does not reach the other two bores. When the valve is turned contrary to the direction of the hands of the clock, the recess 28 will first cover the bore 24 and then also the bore 25 and by such means the main duct leading to the burner and the ignition duct 26 are successively made to communicate with the gas supply.

The sleeve 7 carrying the pyrophorous pin is supported by an angular bracket 29 bolted to the upper end of the body 2. This sleeve contains a spring 30, which presses the pyrophorous pin against the friction wheel, and bears at its top against a screw 31, by which it is possible to regulate the pressure.

The operation of the hereinbefore described arrangement is as follows:

When the ignition lever 15 is pulled downward from its position of rest and contrary to the action of the spring 16, the projection 21 engaging in the recess 22 of lever 4 will move this lever and with it also the rotary valve 1 in the direction of the arrow. In consequence thereof first the main pipe 24 and then the ignition pipe 25 are made to communicate with the gas supply pipe through the recess 28, so that gas will commence to emerge into the burner and from the ignition by-pass 26. In the meantime the ignition lever 15 has by aid of the pawl 14 rotated the intermediate disk 10 against the action of its spring 12, the pawl 9 gliding over the teeth 8 of the friction wheel 6 and the latter remaining at rest. At the lowest position of the ignition lever marked in Fig. 3 with b the pawl 14 will be released by the pin 18, against which it strikes with its extension 32; under action of the spring 12 the intermediate disk 10 will strike back, and its pawl 9 will strike against the next tooth of the ratchet wheel 8 and whirl around the same together with the friction wheel 6 attached thereto. Thereby a powerful stream of sparks will be produced at the point of contact between the friction wheel and the ignition pin, and these sparks will first ignite the gas emerging from the opening in the by-pass. The sharp flame here produced will ignite the gas emerging from the orifice of the by-pass 26 whence the gas emerging from the burner will be lighted.

If now the ignition lever 15 is released, it will return into its position of rest under action of its spring; during this stroke of the lever 15 the projection 21 will first move idle in the recess 22 until it strikes against the edge of same (Fig. 3). From this moment also the lever 4 and with it the rotary valve 1 will be rotated. Owing to the play of the projection 21 in the recess 22 the valve 1 will not yet have reached its closing position, when the ignition lever has already assumed its normal position a; the valve, on the contrary will remain in the intermediate position shown in Fig. 3, at which the duct 25 leading to the ignition by-pass is closed, and the main duct 24 remains open. This position corresponds to the period during which the lamp will be burning. When the lamp is to be extinguished the closing lever 4 is drawn into its lowest position, whereby the main gas duct 24 is shut off.

The abutment pin 18 may be rendered dispensable, by the front end of the angle 29 being extended in the manner indicated by dotted lines in Fig. 2 in front beyond the plane of the intermediate disk 10 so as to form a projection 18' and the shoulder 13 of this disk having a straight edge on the respective side, according to Fig. 6, which straight edge will at the position of rest bear against the extension 18'. The spring 12 is preferably hooked into a hole in the shoulder 13. Also the pin 17' of disk 20 of the ignition lever may be dispensed with if the respective end of the spring 16, which it is to arrest, is laid around the extension 21. The other end of the spring is preferably made to bear against the projection 18'. The recess 22 may be replaced by two ears 33 arranged at the side in an upward direction. The pawl 14 is likewise released by means of the projection 18'. In this case the pawl must be arranged on the side of the disk 20 opposite to that shown in Fig. 1.

With the form of the pawl 14 shown no separate spring is required for the same. Its engagement with the nose of the intermediate disk 10 is insured by its being forced, when in position of rest, against a projection of lug 13, Fig. 5, beyond its fulcrum, which projection provides that the pawl will always bear against the nose. The distance between the nose and the lug 13 is so small compared to the length of the pawl 14, that the pawl will securely engage with the nose, before it could be disengaged by its weight.

The pawl 9 together with spring 11 can be rendered dispensable by the ratchet wheel 8 being made with its ratchet teeth on one side, and a disk of sheet metal being provided between this wheel and the disk 10, the said sheet metal disk having an elastic tongue engaging in an axial direction with the ratchet wheel. Such an arrangement is shown in Figs. 7–12. The sheet metal disk is there indicated by 34; it bears directly against the intermediate disk 10 and is rotated by the same by means of a pin 35 engaging in a recess in the sheet metal 34. The elastic tongue, which engages in the side teeth 8 is formed by a radial cut 36 being made into the sheet metal disk and the latter being bent over backward on the one side of this cut. Fig. 12 shows the relation between the intermediate disk 10, the sheet metal disk 34 and the friction wheel 6 seen in the direction of the arrow in Fig. 7, while Fig. 8 is a view seen from the opposite side.

The ignition device is otherwise practically the same in the Figs. 7–12 as hereinbefore described. An immaterial difference consists in the pyrophorous pin holder 7 being inclined and the relative positions of the ignition and the closing levers respectively to the body 2 have been exchanged. With this constructional form besides special provision has been made to prevent the main gas duct remaining open, when the ignition lever should inadvertently not have been moved so far, that ignition will occur. With the above described device also in this case the rotary valve 1 would be rotated only into the position c (Fig. 3) the unlighted gas would emerge from the burner. For preventing this danger the following arrangement has been provided:

On the front side of the rotary valve 1 (Figs. 9 and 10) is arranged a ratchet tooth 36', which strikes, at the igniting position (Fig. 9) with an extension 37 against the abutment pin 18 and is thereby forced from the path of a recess 22' corresponding to the recess 22 in the foregoing description. Consequently, a pin 38 which projects forwardly from the extension 21 of the igniting lever 15, and which is in the path of the ratchet-tooth 36' may pass by the same. The play between the ignition lever and the rotary lever, due to the recess 22', is utilized in the manner required subsequent to ignition, in order that the lever be again returned into a position corresponding with the closure of the ignition-duct.

If however when the ignition lever is pulled down, the extension 37 of the ratchet tooth does not reach the abutment pin 18, so that the ignition has not been effected, the pin 38 will on the ignition lever rising again, engage in the ratchet tooth 36' (Fig. 10) and return the valve 1 by such means into its closing position, so that no gas can escape. The ratchet tooth 36' will be returned by its own gravity into its operative position shown in Fig. 10. The pin 38, against which it bears with its free end, will prevent its falling down too far.

The form and arrangement of the gas ducts in the body 2 and the rotary valve 1 is somewhat different with this constructional form. Here the sparks produced will first light a stream of gas emerging from a small pipe 26' fitted to the valve and rotating with it. This pipe 26' communicates with a small recess 28' on the rear side of the valve. The second recess 28 has the same shape and also about the same size as the one in the hereinbefore described constructional form. Also the bores 23 and 24 have the same position as the previous ones. The upper bore 23 has however a larger circumferential extension on the face of the valve. The bore 25 leading to the ignition pipe 26 is situated in the present constructional form in the middle between the two others. Fig. 9 shows the position, at which both the main duct leading to the burner and the ignition ducts 26 and 26' are in communication with the gas supply 23, whereas at the position according to Fig. 10 the ignition duct 26' is shut off. In the first mentioned position the orifice of the ignition pipe 26' is directed directly against that of the pipe 26 so that the flame emerging from the former will surely light the gas emerging from the pipe 26. By the ignition lever being held in its lowermost position this position may be maintained for any length of time. In place of the pipe 26' also a fine bore of a suitable direction in the rotary valve may be employed. The angular bracket 29 which carries the sleeve 7 is secured in this constructional form, by means of rivets or the like to the upper side of the body 2.

In the constructional form according to Figs. 13–16 the gas ducts are controlled by means of a cock plug 1'. The configuration of the bores is evident from the diagrams 14$^a$ and 15$^a$ and 16$^a$. The pin 3 which is here rigidly attached to the plug, again carries the loose friction wheel 6, which is toothed on one side 8, and an intermediate disk 10, which is also loose on the pin. The ignition lever 15 and the closing lever 4 which are in this instance made in one piece are fitted on a square of the pin 3 and are rigidly attached to the same by means of a screw 39.

The intermediate disk 10, which is again under action of a spring 12, is made the same as the disk 34 of the second constructional form referred to, made of spring sheet metal, and provided with two tongues 9' and 14' respectively stamped and bent into different directions from the metal, and corresponding to the pawls 9 and 14 in the constructional form according to Fig. 1. Two ears 40 and 19' projecting toward the front from the disk are provided, of which the latter corresponding to the nose 19 of the said constructional form bears at the position of rest against a projection 18' bent downward, of the carrier 29 for the pyrophorous pin sleeve 7. The extension 18' extends into the range of the tongue 14' (Fig. 14) the free end of which is bent over backward at right angles, as may be seen from Fig. 13, so as to form a bearing surface for the lever 4 in which the tongue engages. The sheet metal disk 10 is fitted with a sleeve-like boss on the pin 3 for obtaining a steadier guidance, the said pin 3 being set-off behind the friction wheel 6, so as to afford an abutment for this wheel.

The operation of this constructional form is as follows:

When the ignition lever 15 is pulled down into the position shown by Fig. 15, first the main duct 24 and then the ignition duct 25 will be made to communicate with the gas supply 23. At the same time the disk 10 will be dogged by means of tongue 14' and lever 4 contrary to the action of spring 12, until it reaches the position according to Fig. 15. At this moment the projection 18' past which the tongue 14' is moved, has forced the latter back, so that it is released from the lever 4. Thereby the disk 10 is released; whirls back and will by the engagement of tongue 9' in the teeth of the friction wheel 6 dog the latter, so that the ignition is effected in the hereinbefore described manner: The disk 10 is withdrawn by its spring 12 until the ear 40 bears against the lever 15. If now the hold on this lever is relaxed, it will be raised by the disk and the ear 40 until the ear 19' strikes against the projection 18' (Fig. 16). At this position the ignition duct 25 is shut off from the gas supply. The main duct 24 remains, however, in communication with the latter (Fig. 16$^a$). If also the main duct is to be shut off, the double lever is again pulled into the position shown in Fig. 14.

The constructional form shown in the Figs. 17–19 corresponds in its construction essentially to that according to Figs. 1–6. The rotary valve there is here replaced by a cock plug 1', the bores in which correspond to those of the plug according to Figs. 13–16. The closing lever 4 is here secured to the rear end of the plug. The plug is dogged by the ignition lever 15 by the engagement of the edge of a cap 41 rigidly attached to the pin 3 of the plug in the recess 22, the said cap 41 covering the boss part of the ignition lever together with the spring 16. This spring engages with its one end in an ear 46 of the disk 20 of the ignition lever, and with the other end in the projection 18' of the pyrophorous pin holder 7. This projection again serves as abutment for the intermediate disk, which is otherwise the same as in the constructional form according to Figs. 13–16. The operation is the same as with the device first described.

With the constructional form according to Figs. 20–24, which is intended for upright gas burners, the cock plug is again dogged by the ignition lever 15 by the aid of a cap 41 rigidly fitted to the pin 3 of the plug, the edge of which cap has a corresponding recess 22'. Fig. 22 shows the cap seen from behind. With this constructional form the spring 12', which is attached at one end to a pin 42 of the ignition lever 15 acts at 46 directly on the frictional wheel 6. The spring 12' is hung over a projection 47 of the friction wheel. This projection has a nose 43 against which bears an elastic pawl 44 fitted to a projection 18'' of the pyrophorous pin holder 7. The pawl 44 is fitted with an extension 48, which lies in the path of the ear 42 of lever 15. The torsional spring 16 acts with its one end also on the pin 42, and with its other end on a forward ear of the projection 18''. The closing lever 4 is again fitted to the rear end of the cock plug, the bores in which have the same form as in the previously described constructional forms.

The operation of this device is as follows:

When the ignition lever 15 is pulled the spring 12' will be tightened and at the same time the main and ignition ducts will be opened, as the friction wheel 6 attached to the spring will be retained by the pawl 44. As soon as the pin 42 of the ignition lever strikes against the projection 48 of the pawl, the latter is released, and the friction wheel 6 will whirl back striking a bundle of sparks on the pyrophorous pin. When the lever 15 is being returned by spring 16 the plug of the cock will by the aid of the cap 41 be as usual again returned into the position, at which the ignition duct is shut off. When the lever 4 is pulled back into its position of rest for shutting of the main gas duct, the friction wheel 6 will by the aid of a pin 49 fitted inside the cap which bears against the pin 46 of the friction wheel, be dogged, until the pawl 44 can again engage behind the lug 43.

Also with this constructional form an intermediate disk 10 may be employed. This disk then takes the place of the shoulder 47 of the friction wheel, which then is again provided with teeth on its one side. In Figs. 23 and 24 such an intermediate disk is shown. It consists of a piece of spring sheet metal stamped hollow, and having an ear 9' pressed out of it, which serves as a pawl for dogging the friction wheel 6. Corresponding to the nose 43 in the constructional form according to Figs. 21 and 22 an ear 43' is bent inward from the edge of the disk 10, and against this ear the pawl 44 bears.

In the constructional form shown in Figs. 25–27 the ignition lever 15 is drawn upward by a spring 50 and the intermediate disk by a second spring 12. The disk 10 is generally held locked by a pawl 44' which is pivoted on the projection 18'' of the pyrophorous pin holder 7. The lever 15 is fitted loose on the pin 3 which is rigidly connected to the cock plug, whereas the closing lever 4 is rigidly attached to said pin 3. The lever 4 is dogged with play by the ignition lever 15. The play is obtained by the rearwardly flanged edge of disk 20, in which the lever 15 terminates having a recess 22', which surrounds the lever 4 with some play.

The intermediate disk 10 which is coupled to the friction wheel 6 by means of a sheet metal disk 34, according to Figs. 6–11, is under tension at its position of rest. This tension is produced when the main gas duct is closed by the lever 4 being pulled, which bears with its lower edge against an ear 51 of the intermediate disk 10. When the lamp is to be lighted, the lever 15 is pulled down in the usual manner, whereby the lever 4 is carried upward by the respective edge of the flange of disk 20, until an ear 52 of this lever bears against a projection 48' of the pawl 44' and releases the same. The intermediate disk 10 thereupon whirls back and with it the friction wheel 6, whereby the ignition is effected. The ear 51 of the intermediate disk will then again bear against the lower edge of the lever 4 which is in its highest position. When the ignition lever is again released, it will be returned by spring 50 into its position of rest and will dog the closing lever 4 after the play has been overcome into its position closing the ignition duct. At the same time the intermediate disk 10 is partially turned back. The full tension of the disk upon the locking pawl 44' is effected, as mentioned above at the time of the closing of the main gas duct by pulling down the lever 4, which engages the ear 51 of the intermediate disk. Fig. 27 shows the construction of the intermediate disk 10 with the two levers 4 and 15 seen from behind.

In Figs. 28 and 29 an automatic lighter is shown which is intended to be used for ordinary gas burners and in particular for acetylene gas lanterns. This lighter is attached to the nipple 53 of the burner 54 by means of a sleeve 55 which is fitted over the nipple and is secured by aid of a set screw 56. With this arrangement only one igniting lever 15 is employed, which is not connected with the member closing the gas supply. When the ignition lever 15 is pulled, a spring 12'' which is wound around the pivot 3 of the friction wheel 6 and of the intermediate disk 10 is tightened. The spring 12'' bears with its one end against a pin 18, which is screwed into the holder of the lighter, with the other end against a pin 57 in the intermediate disk 10. The coupling of the lever 15 and the disk 10, and of the latter with the friction wheel is effected in the usual manner by means of pawls and elastic tongues. The pyrophorous pin in this constructional form is fitted in a sleeve 7 and bears with its free end against a screw screwed into the sleeve, the head of said screw resting against the bent over end of a bar 58, the other, likewise bent over end of which can be displaced on a fixed pin 59 contrary to the action of a spring 60 when the screw is tightened. At the same time the force which presses the pyrophorous pin against the friction wheel is varied. The ignition is effected as usual by pulling the lever 15, which will however not return by itself into its position, but must be pushed back by the bar 61.

The various constructional forms herewith described may of course be used for inverted lamps or for upright burners or any other kind of burners, if the details are accordingly modified, so for instance also for acetylene, spirit and other lamps.

The member called the "intermediate disk" in the foregoing description may also have another form, for instance it may be a lever, and may, under certain conditions, be entirely dispensed with, if no great importance is placed in an absolutely certain operation and a great durability of the lighter. The igniting pin is preferably made of cerium iron, but of course also other pyrophorous materials may be employed.

The combination of the rotary valve, or the cock plug respectively, with the lighter device proper with their respective exchangeable parts can also be varied in many ways. Also other means of controlling the gas pipes may be employed.

In place of the levers also handles, knobs or the like may be used. In the constructional form according to Figs. 7–11 the closing lever may be entirely dispensed with, as the main duct may also be closed by a repeated pulling of the ignition lever, which must then however not go quite down into igniting position. In place of the tensile springs also torsional springs may be used and vice versa, also flat springs may in certain instances be used in place of the springs shown.

In Figs. 30 to 32 an automatic lighter according to the present invention is shown in combination with a gas bath stove.

With the gas bath stoves hitherto known the members for shutting off the gas and the water respectively were operated either by means of separate handles or by a joint handle. In both cases first the water supply and then the pipe supplying the lighting flame is opened, whereupon the gas emerging from the latter has to be lighted before the gas is admitted into the heating tubes by further opening the gas valve. Frequently the gas is however lighted only after the gas valve has been fully opened so that the stove is filled with gas before the flame is lighted, and an explosion may easily occur.

This danger is remedied by the present invention, by the timely lighting of the igniting flame being positively enforced, by this being effected automatically as soon as the ignition duct is opened. This is obtained by the handle operating the gas valve being made to operate an automatic lighter by its opening movement after it has opened the ignition duct, whereupon the said lighter will by means of sparks or the like light the gas emerging from the ignition pipe.

With the gas bath stove 101 shown in the drawing a joint water and gas valve 102 is employed, which is operated by means of a handle 103. In the constructional form shown the lever 103 is bent downward at its index end and guided in a slot 105 of the dial plate 106 fitted to the body of the valve. At the point which corresponds to the opened ignition pipe, the slot 105 is bent at right angles and extends radially to the circumference of the dial 106, so that the gas supply to the gas heating pipes arranged in the stove is possible only after the handle 103, which has an oblong hole for the purpose, has been displaced in a radial direction. Before this radial displacing of the handle 103 the gas emerging from the igniting pipe 108 shall, according to the present invention, be positively ignited.

For this purpose a pyrophorous automatic lighter of the hereinbefore described kind has been fitted in such a manner to the gas and water valve, that the sparks jumping from the friction wheel 109 of the device can ignite the gas emerging from the pipe 108. In this lighter device, which is fitted to an ear extending from the body of the valve 102 a loose disk 111 is fitted behind the friction wheel 109 on the spindle 110, which disk is forced with its nose 112 under action of a tensile spring 113 against an abutment pin 114. Behind the disk 111 a lever 115 is loosely fitted on the spindle 110 and is held in its position of rest by the action of a torsional spring 116 on the spindle 110. The lever 115 is coupled to the disk 111 by means of a pawl 118 engaging in a tooth 117 of the disk in such a manner, that it can turn it contrary to the action of the spring 113, being itself swung in opposition to the action of the torsional spring. After the arm 115 together with the disk 111 have been turned through a certain angle, an extension 119 of the pawl 118 will strike against the abutment pin 114 and disengage the pawl from the tooth 117, whereby the disk is released and is whirled back under action of the spring 113. While doing so it is coupled by means of a pawl gear 120, 121 with the friction wheel 109 and dog the latter, so that the sparks are produced.

For operating the automatic lighter on the handle 103 being turned a bell crank 122, 123 is provided and fitted beneath the dial 106, the arm 122 of which, being the one closer to the lighter device is coupled by means of a rod 124 to the lever 115 of said device. The bell crank 122, 123 is arranged at such side of the valve member 102, 106 that the handle 103 will be over the angle formed by the arms of the bell crank 122, 123 when the gas and water supply are both shut off. (Fig. 30.) The handle 103 is provided with a pin 125 having a downward direction, which reaches between the arms of the bell crank 122, 123 and will force the arm 123 of said bell crank against the dial 106 when the handle is moved for opening the valve, and will thus swing over the bell crank, whereby the disk 111 of the lighter device will be turned and at the same time the spring 113 will be tightened. The arm 123 of the bell crank is of such a shape, that the sparking of the lighter device will occur immediately after the gas supply to the igniting pipe has been opened.

For preventing the bell crank 122, 123 from returning into its initial position of rest under action of the torsional spring 116 which has been tightened by the swinging over of arm 115, when the handle is turned still farther, and from preventing the turning back of the handle 103, it is provided with a spring latch which holds it in its adjusted position. This latch has the form of a double armed lever 126, 127 fulcrumed on the arm 122 of the bell crank 122, 123, which double armed lever has the shape of a hook at its lower end 126 engaging under the plate 106 of the valve 102, encircles a pin 128 fitted in the dial 106 and is pressed against said pin by means of a spring 129. The hook shaped end 126 of this latch 126, 127 has such a shape, that it will engage over the pin 128 when the bell crank 122, 123 is rocked, the latch being swung in such a manner by spring 129 and forced against a pin 130 in the arm 122 of the bell crank, that it will move with its upper arm 127 in front of arm 122 of the bell crank in the direction toward the other arm 123 (Fig. 31). After the arm 123 has been released by the pin 125 of the handle 103 the latch 126, 127 will bear with its end 126 against the pin 128 and prevent the bell crank 122, 123 from swinging back. When the handle 103 is turned back the pin 125 of the same will strike against the arm 127 of the latch and disengage the same from the pin 128 so that now the bell crank 122, 123 can swing back into its position of rest under action of the torsional spring 116 on the arm 115 and together with said arm 115. By employing the bell crank 122, 123 it is made possible that the friction wheel 109 can complete a rather large rotation, say about a quarter turn, so that powerful and long sparks are produced.

The invention is not limited to the use of the lighter device shown and described and the gas and water valve shown; it can also be combined with any suitable lighter device and with any other gas or water valve. When two valves are employed for controlling the gas and water supply the lighter device is operated by the handle of the gas valve. In place of the handle 103 of course also a rotary disk or the like may be employed.

By the lighting device according to the present invention explosions of gas bath stoves will be completely prevented, as immediately on the opening of the gas supply, the gas emerging from the ignition pipe will be lighted immediately after it has been admitted into this pipe, in an automatic manner, and before the gas is admitted into the heating pipes. This lighter device can therefore be used both with gas bath stoves and ordinary gas stoves.

The arrangements shown in Figs. 33 to 37 illustrate the use of the present invention for lighting gas cookers, gas ranges, gas baking ovens and the like with several burners. The automatic lighter which operates with either one or several sharp flames, is fitted in front of the burners, and preferably on the gas distributing pipe. The thin sharp flame will reach into the range of the gas emerging from the single burners, so that several burners may be lighted with the flame. The device is preferably fitted in an oscillating manner to the gas pipe, so that the flame may be directed toward each single burner. For the burners lying beyond the range of the flame of the device auxiliary igniting tubes are employed which open within the range of this flame, and produce a second flame which in its turn reaches up to the burner.

On the gas distributing pipe 201 of an ordinary gas cooker 202 with two burners 203 next to each other a pyrophorous automatic gas lighter is fitted, preferably in the middle between the two levers 203 in such a manner, that the pipe 206 serving to produce the igniting flame receives its gas supply from the pipe 201. The flame produced will reach up to between the two burners 203 so that when the cocks 204 are opened, the gas emerging from them will be lighted. For allowing of directing the flame toward each of the burners singly, the lighter is fitted so as to swivel on the gas pipe 201.

For this purpose the gas lighter is provided with a conical plug 209 (Fig. 35) which is rotatably fitted in a part 211 held by means of a strap 210 to the gas pipe 201. For forming a communication between the igniting pipe 206 and the gas pipe 201 a screw plug 212 is provided in the part 211 which is forced at its taper end 213 by means of a strap 210 gas tight into a hole in the gas pipe. This allows of easily fitting the device at any point of the gas pipe. The screw 212 which has the object of allowing of a convenient adjustment, has a bore 214, which forms together with the bore 215 in the part 211, the bore 216 in the cone 209 and the bore 217 in the body 218 a duct leading up to the rotary valve 219. This valve 219 is fitted directly to the operating spindle 220 of the lighter and is rotatably coupled by means of a pin 221 to the spindle. The rotary valve 219 is forced by a spring 222 against its seat and is provided with a groove which connects the bore 214—217 with the bore 224 leading to the ignition pipe 206. The arrangement is such, that the connection of the two bores 214—217 and 224 and therefore the escaping of the gas from the pipe 206 is effected immediately before the sparks are produced. The flame emerging from the igniting pipe will burn as long as the valve 219 is held by the handle of the spindle 220 contrary to the action of spring 225 in its swung out position. When the handle is released the valve will be turned back by spring 225 and the gas supply to the igniting pipe 208 is shut off.

The arrangement of the lighter proper is immaterial, only the one described in the constructional forms specified hereinbefore is preferred. For avoiding the lighter being soiled by food boiling over and the like it is inclosed by a guard hood 226.

With a cooker having four burners 203, 227 (Fig. 34) the rear burners 227 will be beyond the range of the igniting flame of the lighter 205 fitted to the gas distributing pipe, so that they cannot be lighted from this flame. In this case an auxiliary pipe 228 is employed, which is branched off from the gas pipe 201 and preferably from the respective cocks 229 of the burners, and ends still within the range of the flame emerging from the pipe 206, so that the gas emerging from the pipe 228 will be lighted by the flame of the lighter and will thus produce a second flame reaching into the range of the gas emerging from the burner 227. The auxiliary pipe 228, or at least its end is directed toward the burner 227. The pipe 228 may be opened either by the valve 229 of the respective burners 227 (Fig. 34 on the left, and Fig. 36) or it may be provided with a separate valve 30 (Fig. 34 on the right and Fig. 37). In the former instance the valve 229 must be such (Fig. 36) that it admits of the plug being turned a very little, while the burner supply pipe 231 remains fully open, and the auxiliary pipe 228 is opened for lighting and may be closed, without the size of the flame of the burner being affected.

The arrangement described may be used for gas cookers as well as for gas ranges, gas baking ovens and similar heating and cooking apparatus.

What we claim is:

1. In an automatic lighter for gas burners and the like comprising a main duct for the burner, an auxiliary burner, an auxiliary duct for said auxiliary burner, means for controlling said main duct and said auxiliary duct, an igniting device consisting of a pyrophorous body and a friction body coacting with said pyrophorous body, common means for operating said controlling means and said igniting device, means for automatically returning said operating means to its initial position, and means for closing only said auxiliary duct during the full return movement of said operating means.

2. In an automatic lighter for gas burners and the like comprising a main duct for the burner, an auxiliary burner, an auxiliary duct for said auxiliary burner, a valve controlling said main duct and said auxiliary duct, an igniting device close to the auxiliary burner consisting of a pyrophorous body and a friction body coacting with said pyrophorous body, means for simultaneously operating said valve and said igniting device, means for automatically returning said operating means to its initial position of rest and means for closing only said auxiliary duct during the full return movement of said operating means.

3. In an automatic lighter for gas burners and the like comprising a main duct for the burner, an auxiliary burner, an auxiliary duct for said auxiliary burner, a valve simultaneously controlling said main duct and said auxiliary duct, an igniting device close to the auxiliary burner consisting of a pyrophorous body and a friction wheel coacting with said body, a lever for simultaneously operating said valve and said igniting device, a spring acting on said lever and having the tendency of returning it to its initial position when released, said lever being coupled to said valve in such a manner as to move it only after having traveled a certain amount of its throw.

4. In an automatic lighter for gas burners and the like comprising a main duct for the burner, an auxiliary burner, an auxiliary duct for said auxiliary burner, a valve controlling said main duct and said auxiliary duct, an igniting device consisting of a pyrophorous body and a friction wheel coacting with said body, a lever for simultaneously operating said valve and said igniting device, a spring acting on said lever and having the tendency of returning it to its initial position when released, said lever being coupled with said valve by means of a dog adapted to strike against two abutments connected to said valve, said abutments being at such a distance from each other, that the valve will be moved by said lever when the latter is returning into its position of rest, only so far as to close the auxiliary duct.

5. In an automatic lighter for gas burners and the like comprising a main duct for the burner, an auxiliary burner, an auxiliary duct for said auxiliary burner, a valve controlling said main duct and said auxiliary duct, an igniting device close to the auxiliary burner consisting of a pyrophorous body and a friction wheel coacting with said body, a lever for simultaneously operating said valve and said igniting device, a spring acting on said lever and having the tendency to return it to its initial position when released, said lever having the same axis as said valve, a recess provided in a disk connected to said valve and a dog secured to said lever and engaging said recess, the width of said dog being substantially smaller than the width of said recess.

6. In an automatic lighter for gas burners and the like comprising a main duct for the burner, an auxiliary burner, an auxiliary duct for said auxiliary burner, means for controlling said main duct and said auxiliary duct, an igniting device consisting of a pyrophorous body and a friction wheel coacting with said pyrophorous body, means for simultaneously operating said controlling means and said igniting device, means for automatically returning said operating means to its initial position, said operating means being so connected to said controlling means as to close only said auxiliary duct, and means for returning said controlling means automatically in its closed position in case the ignition should fail.

7. In an automatic lighter for gas burners and the like comprising a main duct for the burner, an auxiliary burner, an auxiliary duct for said auxiliary burner, a valve controlling said main duct and said auxiliary duct, an igniting device close to the auxiliary burner consisting of a pyrophorous body and a friction wheel coacting with said body, a lever for simultaneously operating said valve and said igniting device, a spring acting on said lever and having the tendency to return it to its initial position when released, said lever being coupled with said valve by means of a dog adapted to strike against two abutments connected to said valve, said abutments being at such a distance from each other, that the valve will be moved by said lever when the latter is returning into its position of rest, only so far as to close the auxiliary duct, and means for returning the valve automatically into its closed position in case the ignition should fail, said returning means consisting of a clutch adapted to automatically couple said lever and said valve and means to render said clutch ineffective in the position corresponding to the beginning of the operation of the friction wheel.

8. In an automatic lighter for gas burners and the like comprising a main duct for the burner, an auxiliary burner, an auxiliary duct for said auxiliary burner, a valve controlling said main duct and said auxiliary duct, an igniting device close to the auxiliary burner consisting of a pyrophorous body and a friction wheel coacting with said body, a lever for simultaneously operating said valve and said igniting device, a spring acting on said lever and having the tendency to return it to its initial position when released, said lever having the same axis as said valve, a recess provided in a disk connected to said valve and a dog secured to said lever and engaging said recess, means for returning said controlling means automatically to its closed position in case the ignition should fail, said returning means consisting of a ratchet tooth pivotally connected to said valve and having an extension adapted to strike at the igniting position against a stop, thereby being forced with a projection from the path of the dog engaging said recess.

9. In an automatic lighter for gas burners and the like, an igniting device consisting of a friction wheel coacting with a pyrophorous body, means for operating said friction wheel, a spring acting on said friction wheel by the medium of a rotatable disk coupled to said friction wheel by means of a ratchet gear and to said operating means by a disengageable dog clutch, said rotatable disk having the same rotating axis as said operating means.

10. In an automatic lighter for gas burners and the like, an igniting device consisting of a friction wheel coacting with a pyrophorous body, means for operating said friction wheel by the medium of a spring actuated rotatable member which is coupled to said friction wheel by means of a ratchet gear and to said operating means by a disengageable dog clutch, said rotatable member having the same rotating axis as said operating means and said friction wheel.

11. In an automatic lighter for gas burners and the like, an igniting device consisting of a friction wheel coacting with a pyrophorous body, means for whirling the friction wheel, said means consisting of a whirling spring acting on the friction wheel, means for tightening and means for releasing said spring, means for operating said releasing means, said whirling spring being connected to an intermediate disk which is coupled to said friction wheel by means of a ratchet gear and to said operating means by a disengageable dog clutch, said disk being rotatable about the same axis as said friction wheel and said operating means.

12. In an automatic lighter for gas burners and the like comprising a main duct for the burner, an auxiliary burner, an auxiliary duct for said auxiliary burner, a valve controlling said main duct and said auxiliary duct, an igniting device close to the auxiliary burner consisting of a pyrophorous body and a friction wheel coacting with said body, means for operating said valve, means for whirling the friction wheel consisting of a whirling spring acting on the friction wheel, means for tightening and means for releasing said spring, means for operating said releasing means by said tightening means, said whirling spring being connected to an intermediate disk which is coupled to the said friction wheel by means of a ratchet gear and to the operating means by a disengageable dog clutch.

13. In an automatic lighter for gas burners and the like comprising a main duct for the burner, an auxiliary burner, an auxiliary duct for said auxiliary burner, a valve controlling said main duct and said auxiliary duct, an igniting device close to the auxiliary burner consisting of a pyrophorous body and a friction wheel coacting with said body, means for operating said valve, so that it opens the main duct and the auxiliary duct successively, means for whirling the friction wheel consisting of a whirling spring acting on the friction wheel, means for tightening and releasing the said spring means for operating said releasing means by said operating means in such a manner, that the releasing is effected after the auxiliary duct has been opened, said whirling spring acting on an intermediate member which is coupled to the said friction wheel by means of a ratchet gear, and to the operating means by a disengageable dog clutch, said intermediate member consisting of a piece of spring sheet metal having a projection bent out of it and a projecting tongue adapted to engage behind said operating means, said friction wheel having lateral teeth, said projection engaging in said lateral teeth.

14. In an automatic lighter for gas burners and the like comprising a main duct for the burner, an auxiliary burner, an auxiliary duct for said auxiliary burner, a valve controlling said main duct, and said auxiliary duct an igniting device close to the auxiliary burner consisting of a pyrophorous body and a friction wheel coacting with said body, means for operating said valve, so that it opens the main duct and the auxiliary duct successively, means for whirling the friction wheel consisting of a whirling spring acting on the friction wheel, means for tightening and releasing the said spring, means for operating said releasing means by said operating means in such a manner, that the releasing is effected after the auxiliary duct has been opened, said whirling spring acting on an intermediate member which is coupled to the said friction wheel by means of a ratchet gear, and to the operating means by a disengageable dog clutch, the said dog clutch consisting of a pivoted pawl on said operating means and adapted to engage behind a shoulder of said intermediate member, a nose on said pawl, a fixed abutment in the path of said nose.

15. In an automatic lighter for gas burners and the like comprising a main duct for the burner, an auxiliary burner, an auxiliary duct for said auxiliary burner, a valve controlling said main duct and said auxiliary duct, an igniting device close to the auxiliary burner consisting of a pyrophorous body and a friction wheel coacting with said body, means for operating said valve, so that it opens the main duct and the auxiliary duct successively, means for whirling the friction wheel consisting of a whirling spring action on the friction wheel, means for tightening and releasing said spring, means for operating said releasing means by said operating means in such a manner, that the releasing is effected after the auxiliary duct has been opened, said whirling spring acting on an intermediate member which is coupled to the said friction wheel by means of a ratchet gear, and to the operating means by a disengageable dog clutch, the said dog clutch consisting of a pivoted pawl on said operating means and adapted to engage behind a shoulder of said intermediate member, a nose on said pawl, a fixed abutment in the path of said nose, on said intermediate member a second shoulder adapted to engage with a part of said pawl which is beyond the fulcrum of said pawl.

16. In an automatic lighter for gas burners and the like comprising a main duct for the burner, an auxiliary burner, an auxiliary duct for said auxiliary burner, a valve controlling said main duct and said auxiliary duct, an igniting device close to the auxiliary burner consisting of a pyrophorous body and a friction wheel coacting with said body, a pivoted lever for operating said valve in such a manner that the main duct and the auxiliary duct are opened successively, means for whirling the friction wheel consisting of a whirling spring acting on the friction wheel, means for tightening and releasing the said spring, means for operating said releasing means by said operating means in such a manner, that the releasing is effected after the auxiliary duct has been opened, said whirling spring acting on an intermediate member which is coupled to the said friction wheel by means of a ratchet gear, and to the operating means by a disengageable dog clutch, means for automatically returning said lever into its position of rest, said lever coupled with said valve by a member adapted to strike against two abutments connected to said valve, said abutments being at such a distance from each other, that the valve will be dogged by said lever when the latter is returning into its position of rest, only so far as to close the auxiliary duct.

17. In an automatic lighter for gas burners and the like comprising a main duct for the burner, an auxiliary burner, an auxiliary duct for said auxiliary burner, a valve controlling said main duct and said auxiliary duct, an igniting device close to the auxiliary burner consisting of a pyrophorous body and a friction wheel coacting with said body, a pivoted lever for operating said valve in such a manner, that the main duct and the auxiliary duct are opened successively, means for whirling the friction wheel consisting of a whirling spring acting on the friction wheel, means for tightening and releasing the said spring means for operating said releasing means by said operating means in such a manner, that the releasing is effected after the auxiliary duct has been opened, said whirling spring acting on an intermediate member, which is coupled to the said friction wheel by means of a ratchet gear, and to the operating means by means of a disengageable dog clutch, the said dog clutch consisting of a pivoted pawl on said operating lever and adapted to engage behind a shoulder of said intermediate member, a nose on said pawl, a fixed abutment in the path of said nose, means for automatically returning said lever into its position of rest, said lever coupled with said valve by a member adapted to strike against two abutments connected to said valve, said abutments being at such a distance from each other, that the valve will be dogged by said lever, when the latter is returning into its position of rest, only so far as to close the auxiliary duct.

18. In an automatic lighter for gas burners and the like comprising a main duct for the burner, an auxiliary burner, an auxiliary duct for said auxiliary burner, a valve controlling said main duct and said auxiliary duct, an igniting device close to the auxiliary burner consisting of a pyrophorous body and a friction wheel coacting with said body, a pivoted lever for operating said valve in such a manner, that the main duct and the auxiliary duct are opened successively, means for whirling the friction wheel consisting of a whirling spring acting on the friction wheel, means for tightening and releasing the said spring means for operating said releasing means in such a manner, that the releasing is effected after the auxiliary duct has been opened, means for automatically returning said lever to its position of rest and means for simultaneously returning said valve into its position corresponding to the closing of the auxiliary duct.

19. In an automatic lighter for gas burners and the like comprising a main duct for the burner, an auxiliary burner, an auxiliary duct for said auxiliary burner, a valve controlling said main duct and said auxiliary duct, an igniting device close to the auxiliary burner consisting of a pyrophorous body and a friction wheel coacting with said body, a pivoted lever for operating said valve in such a manner, that the main duct and the auxiliary duct are opened successively, means for whirling the friction wheel consisting of a whirling spring acting on the friction wheel, means for tightening and releasing the said spring means for operating said releasing means in such a manner, that the releasing is effected after the auxiliary duct has been opened, the said releasing means consisting of a pawl pivoted to said lever and adapted to engage behind a projection in connection with the friction wheel, a fixed abutment in the path of said pawl and adapted to disengage the same from said projection.

20. In an automatic lighter for gas burners and the like comprising a main duct for the burner, an auxiliary burner, an auxiliary duct for said auxiliary burner, a valve controlling said main duct and said auxiliary duct, an igniting device close to the auxiliary burner consisting of a pyrophorous body and a friction wheel coacting with said body, means for operating said valve, so that it opens the main duct and the auxiliary duct successively, means for whirling the friction wheel consisting of a whirling spring acting on the friction wheel means for tightening and releasing the said spring means for operating said releasing means by said operating means in such a manner, that the releasing is effected after the auxiliary duct has been opened, said whirling spring acting on an intermediate member, which is coupled to the said friction wheel by means of a ratchet gear, and to the operating means by a disengageable dog clutch, the said dog clutch consisting of a pivoted pawl on said lever and adapted to engage behind a shoulder of said intermediate member, a nose on said pawl, a fixed abutment in the path of said nose, and a holder for said pyrophorous body, the said abutment arranged on said holder.

21. In an automatic lighter for gas burners and the like comprising a main duct for the burner, an auxiliary burner, an auxiliary duct for said auxiliary burner, a valve controlling said main duct and said auxiliary duct, an igniting device close to the auxiliary burner consisting of a pyrophorous body and a friction wheel coacting with said body, means for operating said valve, so that it opens the main duct and the auxiliary duct successively, means for whirling the friction wheel consisting of a whirling spring acting on the friction wheel, means for tightening and releasing the said spring, means for operating said releasing means by said operating means in such a manner, that the releasing is effected after the auxiliary duct is opened, said auxiliary duct opening in two gas pipes, the one of which opens into a tube, the other opening close to the point where the friction wheel and friction body co-act and directed toward the mouth of said tube.

22. In an automatic lighter for gas burners and the like comprising a main duct for the burner, an auxiliary burner, an auxiliary duct for said auxiliary burner, a valve controlling said main duct and said auxiliary duct, an igniting device close to the auxiliary burner consisting of a pyrophorous body and a friction wheel co-acting with said body, means for operating said valve, so that it opens the main duct and the auxiliary duct successively means for whirling the friction wheel consisting of a whirling spring acting on the friction wheel, means for tightening and releasing the said spring means for operating said releasing means by said operating means in such a manner, that the releasing is effected after the auxiliary duct has been opened, said whirling spring acting on an intermediate member which is coupled to said friction wheel by means of a ratchet gear, and to the operating means by a disengageable dog clutch, said auxiliary duct opening in two gas pipes, the one of which opens into a tube, the other opening close to the point where the friction wheel and the friction body co-act and directed toward the mouth of said tube.

23. In an automatic lighter for gas burners and the like comprising a main duct for the burner, an auxiliary burner, an auxiliary duct for said auxiliary burner, a valve controlling said main duct and said auxiliary duct, an igniting device close to the auxiliary burner consisting of a pyrophorous body and a friction wheel co-acting with said body, means for operating said valve, so that it opens the main duct and the auxiliary duct successively, means for whirling the friction wheel consisting of a whirling spring acting on the friction wheel, means for tightening and releasing the said spring means for operating said releasing means by said operating means in such a manner, that the releasing is effected after the auxiliary duct has been opened, said whirling spring acting on an intermediate member which is coupled to said friction wheel by means of a ratchet gear, and to the operating means by a disengageable dog clutch, said auxiliary duct opening in two gas pipes, the one of which opens into a tube, the other opening close to the point where the friction wheel and friction body co-act and directed toward the mouth of said tube, said other gas pipe rotatable together with said valve.

24. In an automatic lighter for gas burners and the like comprising a main duct for the burner, an auxiliary burner, an auxiliary duct for said auxiliary burner, a valve controlling said main duct and said auxiliary duct, an igniting device close to the auxiliary burner consisting of a pyrophorous body and a friction wheel coacting with said body, means for operating said valve, so that it opens the main duct and the auxiliary duct successively, means for whirling the friction wheel consisting of a whirling spring acting on the friction wheel means for tightening and releasing the said spring, means for operating said releasing means by said operating means in such a manner, that the releasing is effected after the auxiliary duct has been opened, said whirling spring acting on an intermediate member which is coupled to the said friction wheel by means of a ratchet gear, and to the operating means by a disengageable dog clutch, said auxiliary duct opening in a gas pipe, said gas pipe rotatable together with said valve.

25. In an automatic lighter for gas burners and the like comprising a main duct for the burner, an auxiliary burner, an auxiliary duct for the said auxiliary burner, a valve controlling said main duct and said auxiliary duct, an igniting device close to the auxiliary burner consisting of a pyrophorous body and a friction wheel coacting with said body, means for operating said valve, so that it opens the main duct and the auxiliary duct successively, means for whirling the friction wheel consisting of a whirling spring acting on the friction wheel, means for tightening and releasing the said spring, means for operating said releasing means by said operating means in such a manner, that the releasing is effected after the auxiliary duct has been opened, said valve having the form of a rotary valve coaxial with said friction wheel.

26. In an automatic lighter for gas burners and the like comprising a main duct for the burner, an auxiliary burner, an auxiliary duct for said auxiliary burner, a valve controlling said main duct and said auxiliary duct, an igniting device close to the auxiliary burner consisting of a pyrophorous body and a friction wheel coacting with said body, a pivoted lever for operating said valve in such a manner, that this main duct and the auxiliary duct are opened successively, means for whirling the friction wheel consisting of a whirling spring acting on the friction wheel, means for tightening and releasing the said spring, means for operating said releasing means in such a manner, that the releasing is effected after the auxiliary duct has been opened, said whirling spring acting on an intermediate member which is coupled to the said friction wheel by means of a ratchet gear, and to the operating means by a disengageable dog clutch, means for automatically returning said lever into its position of rest, said lever coupled by a dog with said valve adapted to strike against two abutments connected to said valve, said abutments being at such distance from each other, that the valve will be dogged by said lever, when the latter is returning into its position of rest, only so far as to close the auxiliary duct, said valve coaxial with said friction wheel and the fulcrum of said lever.

27. In an automatic lighter for gas burners and the like comprising a main duct for the burner, an auxiliary burner, an auxiliary duct for said auxiliary burner, a valve controlling said main duct and said auxiliary duct, an igniting device close to the auxiliary burner consisting of a pyrophorous body and a friction wheel coacting with said body, a pivoted lever for operating said valve in such a manner, that the main duct and the auxiliary duct are opened successively, means for whirling the friction wheel consisting of a whirling spring acting on the friction wheel, means for tightening and releasing the said spring means for operating said releasing means in such a manner that the releasing is effected after the auxiliary duct has been opened, said whirling spring acting on an intermediate member which is coupled to the said friction wheel by means of a ratchet gear, and to the operating means by a disengageable dog clutch, said ducts arranged in a metallic body, on said metallic body a pivot, said valve consisting of a rotary disk, said lever, said friction wheel and said rotary valve fitted loose on said pivot, said intermediate member consisting of a disk fitted loose on said pivot and a spring between said friction wheel and said rotary valve.

In testimony whereof we have signed our names to this specification in the presence of two subscribing witnesses.

HANS KLEINSCHMIDT.
ADOLF HALPERN.
EMIL POSPISCHIL.

Witnesses for Hans Kleinschmidt:
  WOLDEMAR HAUPT,
  ARTHUR SCHROEDER.

Witnesses for Adolf Halpern:
  RALPH W. DOX,
  ERNST DAMMERLANG.

Witnesses for Emil Pospischil:
  AUGUST FUGGER,
  ADELAIDE FUARLN.

Copies of this patent may be obtained for five cents each, by addressing the "Commissioner of Patents, Washington, D. C."